(No Model.)
P. DUFRESNE.
PIPE COUPLING FOR RAILWAY CARS.
No. 371,558. Patented Oct. 18, 1887.
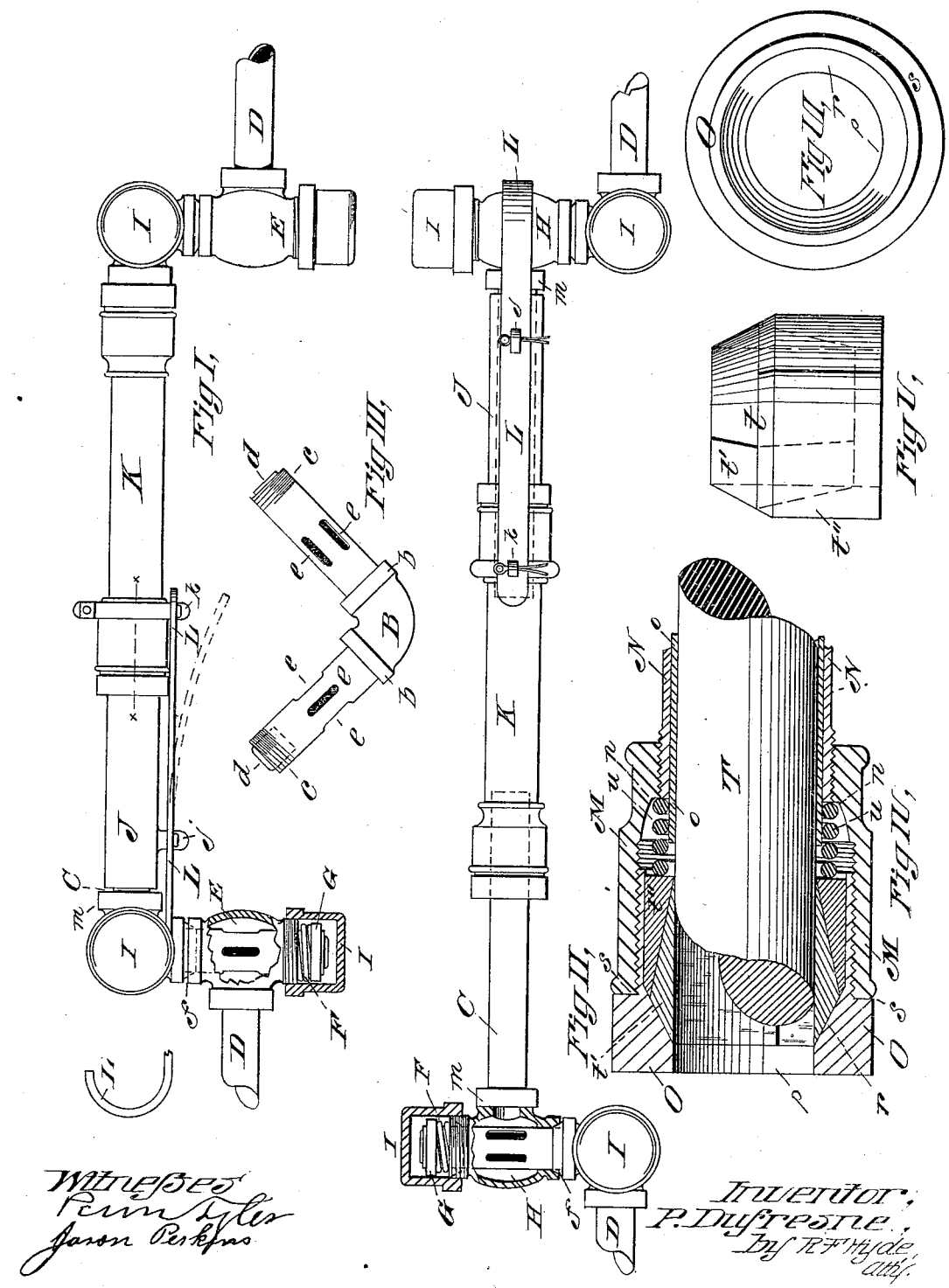
Witnesses
Inventor,
P. Dufresne,

UNITED STATES PATENT OFFICE.

PETER DUFRESNE, OF SPRINGFIELD, MASSACHUSETTS.

PIPE-COUPLING FOR RAILWAY-CARS.

SPECIFICATION forming part of Letters Patent No. 371,558, dated October 18, 1887.

Application filed April 4, 1887. Serial No. 233,574. (No model.)

*To all whom it may concern:*

Be it known that I, PETER DUFRESNE, a subject of the Queen of Great Britain, residing at Springfield, Hampden county, State of Massachusetts, have invented a new and useful Improved Pipe-Coupling between Railroad-Cars, of which the following is a specification.

My invention relates more particularly to a coupling for pipe ends between railroad-cars, and to universal joints to which each pipe end is connected, having for their object an air or steam tight passage from car to car, as well as a latitude of motion in the coupled pipe ends compensating for a relative deflection of the car ends; and the invention consists in the combination and construction as hereinafter described, and more particularly pointed out in the claims.

My invention is fully illustrated in the accompanying drawings, in which—

Figure I is a view in one plane and in partial section of my complete device. Fig. II is a view of the complete device and in partial section in a plane at right angles to that occupied in Fig. I. Fig. III is a detail view. Fig. IV is a section on the dotted line $x\,x$ of Fig. I, and Figs. V and VI are complete views of parts shown in section in Fig. IV.

The universal joint upon each car connecting the free pipe end with the main pipe under the car is constructed as follows: An angle-pipe, B, (shown more particularly in Fig. III,) is provided with annular shoulders $b\,b$ at the base of each arm, is provided with threads $c\,c$ upon the top of each arm, and has the orifice in each pipe end closed, as indicated by plugs $d\,d$, showing above said ends. The arms of pipe B have also, about midway between their ends and the shoulders $b\,b$, circumferential ports $e\,e$ to its interior.

The free pipe ends C to be coupled and the main pipes D beneath the cars are hinged to the angle-pipes B as follows: A sleeve, E, with its opposite open ends adapted to fit snugly one arm of the angle-pipe B, is passed over said arm, to bear against a shoulder, $b$. A compression-spring, F, is passed over the free end of the pipe-arm, projecting beyond the sleeve E, to rest on the near end of said sleeve, and a collar, G, is run upon the thread $c$ to compress the spring F, to cause it in turn to bear the bottom of the sleeve against the shoulder $b$. A conical ring-packing, $f$, interposed between the spring and the sleeve E and between the sleeve and shoulder $b$, forms a tight joint between the interior of the sleeve and the surface of the pipe-arm on each side of the ports $e$, and the wall of the sleeve E is swelled opposite the ports $e$, as shown, to form a continuous unreduced passage around them.

The sleeve E is shown as forming a rigid part of pipe D, and the pipe C is shown connected in the same way by a sleeve, H, to the remaining arm of the angle-pipe B.

It will be seen that the pipe C can be swung in either of two planes at right angles or simultaneously in both upon the hinges formed by the angle-pipe B, and corresponding pipe ends C and hinges, as described, arranged as reverse counterparts, permit to coupled pipe ends C all of the motion required to adapt themselves to the swaying of the car ends.

To form a tighter joint and protect the collar G, spring F, and joint formed by the sleeve E and angle-pipe B from dust, as well as to form an oil-receptacle when desired, I thread one end of sleeves C and H and screw upon it a cap, I, which, while rotating with its sleeve, incloses the spring F and collar G.

The coupling for the free pipe ends C consists of a sleeve, J, of shorter length than one pipe end C, adapted to fit snugly over the pipe C′, but so as to be easily rotated thereon by hand, and provided with a stud, $j$, radiating therefrom. A sleeve, K, of greater length than one pipe end C, is packed to make a close joint with both pipe ends C, over which it is designed to pass, and provided with a stud, $k$, adapted to be aligned with the stud $j$, and a spring-strap, L, having a hook end adapted to partially inclose sleeve H, and a flat portion having openings for the studs $k\,j$ therein, so arranged that when the sleeve J is bearing against shoulder $m$ and the sleeve K is bearing against sleeve J and the strap is hooked over sleeve H said openings will come opposite the studs $k\,j$, which, being passed therethrough and keyed, hold both sleeves to one sleeve H.

The object of sleeve J is to form an intermediate point of attachment between sleeve H and sleeve K, which enables the attachment device proper (the part L) to be shifted to either pipe C, to be readily combined with its sleeve H and the sleeve K.

The sleeve J, together with the sleeve H, enables the hook-strap L to be easily combined with either pipe end C; and in practice when so arranged the sleeve K is passed over the other pipe end C, the two pipe ends C are aligned, and the sleeve K is slid to embrace both pipe ends and come against the end of sleeve J. When in this position, the sleeve K is rotated, or the stud on it, to come in line with stud $j$, and the strap part of hook L is sprung, as indicated in dotted lines, to pass over the stud $k$, where it is keyed or otherwise secured, as shown.

The combined length of both sleeves J K is proportioned so that the bunters of the cars will prevent the pipe ends C from coming quite in contact, so that they could be jammed, and so that the maximum distention of the cars while coupled will not withdraw the pipe ends from without the sleeve K.

It will be seen that upon a derailment of the cars the ends C will be uncoupled, so that steam in the pipes would escape into the open air.

In Fig. I the sleeve J and hook L are combined with the opposite hinge from which they are shown combined in Fig. II.

In Fig. II the pipe ends C are shown slid apart in the sleeve K, and this reciprocation allowed them, together with their individual and joint motion upon their sleeve-hinges H and E, permits them to remain coupled through all motion of the cars when themselves coupled.

Both ends of sleeve K are necessarily packed to form tight joints with pipe ends C, and my stuffing-box and packing are peculiar, as follows: An enlarged end, M, of the tube N, forming the sleeve proper, supplies an enlarged counterbore with a shoulder, $n$, at its base. The tube N is provided with a metal bushing, $o$, preferably of different metal from that of which the pipes C are formed. The bushing $o$, extending into the enlarged end M past the shoulder $n$, leaves a recess, in which rests a coil-spring, thus held by the projecting bushing from actual contact with the surface to be packed. Within the end M is screwed a part, O, combining the features of a gland and cage of the ordinary stuffing-box when thus combined with an enlarged pipe end, M, having a shoulder, $n$, at its base.

The part O, as shown in section, Fig. IV, and in plan, Fig. VI, has a mouth, $p$, to admit easily the cylinder to be packed, has a conical throat, $r$, leading to a cylindrical part larger in diameter than the mouth $p$, and has a shoulder, $s$, adapted to close against the tube end M, and is also adapted to be run into place by a spanner or other wrench. Within the part O, to bear between the throat $r$ and the shoulder $n$, is placed the packing $t$, to be compressed upon the cylinder-surface T.

In the drawings a peculiar ring-packing is shown combined with a coil-spring, $u$. The packing $t$ consists of two split rings, $t'$ $t''$, setting into each other, so that, the conical ends of both coinciding, each bears upon the throat $r$ when pressed by spring $u$. The exterior of section $t'$, received within section $t''$, is the frustum of a cone united at its base to the part bearing upon throat $r$ and fitting into a corresponding cone-socket in section $t''$.

The interior bore of the combined sections is that of the cylinder T, and the section $t''$ has a base equal to the combined diameter of the two sections at any point, and against this base the pressure of the spring $u$ acts to cause both sections to travel on the throat $r$ to maintain a packing-surface on cylinder T in taking up all wear, and the section $t'$, while having its cylindrical surface pressed uniformly upon the cylinder T, is backed always solidly by the section $t''$ bearing equally against it and the wall of the part O.

Now, having described my invention, what I claim is—

1. The within-described coupling for pipe ends between railway-cars, consisting of angle-pipes B, having their ends closed, provided with ports $e$ upon each arm and shoulders $b$, and combined with sleeves respectively connected to and upon the ends of pipes D and C, to form a continuous passage, and held to the arms of said pipe B, to form steam-tight joints therewith, in combination with a sleeve adapted to inclose both free pipe ends C and be held to one sleeve H, substantially as shown and described.

2. In pipe-couplings for railway-cars, the combination, with one arm of an angle-pipe, B, provided with a shoulder, $b$, circumferential ports $e$, and threaded closed end $c'$, of a sleeve bearing upon said arm upon both sides of said ports $e$ and upon the shoulder $b$, provided with a passage therein around said ports, and in combination with a collar, G', and spring F, operating to pack said sleeve upon the pipe-arm.

3. In pipe-couplings for railway-cars, the combination, with one arm of an angle-pipe, B, forming a joint at one end thereof, provided with ports $e$, shoulder $b$, and collar G, and having arranged therewith, as shown, a sleeve and spring, F, interposed between said sleeve and collar G, of a cap, I, adapted to screw over one end of the sleeve to inclose the collar and spring, as and for the purpose set forth.

4. In a pipe-coupling between railway-cars, the combination, with the free hinged pipe ends C of contiguous cars, and having external shoulders near their hinge-joints, of two sleeves, J K, arranged end to end to inclose the two pipe ends C, to have one outer end bear against the shoulder of one pipe end C and the other end removed by an interval from the shoulder of the other pipe end C, and of a combined length to leave a space therein between the pipe ends C, and a hook, L, arranged substantially as shown, to tie the two sleeves J K together and to the pipe-shoulder against which they bear, whereby upon the release of said hook the sections J K may be divided upon the two pipe ends C to permit them to be separated or approached.

5. The improved stuffing-box for pipe ends, consisting of the combination, with a pipe, N, of an enlarged pipe, M, prolonged from the end thereof, counterbored to leave a shoulder, $n$, surrounding the perimeter of pipe N and internally threaded, a tube, O, externally threaded to screw into the one M, having an internal packing-chamber with a conical top, $r$, and having the shoulder $n$ for its base, and having upon its outer end a flange, $s$, perforated or squared to receive a spanner or other wrench, and a packing, $t$, bearing between the conical top $r$ and shoulder $n$, all arranged substantially as shown.

6. The combination of tube N, bushing $o$, projecting beyond the end thereof, as shown, enlarged tube end M, having shoulder $n$, part O, arranged with tube end M, as shown, and provided with a conical throat, $r$, as one end of a packing-chamber therein, ring-packing $t$, and coil-spring $u$, bearing between the packing $t$ and shoulder $n$, and arranged outside of bushing $o$, all arranged substantially as shown and described.

7. The improved packing for stuffing-boxes having a cylindrical chamber provided with one conical end, $r$, and consisting of a split section, $t'$, in one piece of the form of two conical rings united at their bases, and another section, $t''$, in the form of a conical annulus with an outward-beveled rim, the two sections combined, as shown, to have one cone side of section $t'$ and the beveled end of section $t''$ conform to the cone $r$ and in contact therewith, and the other cone side of section $t'$ seated in the section $t''$, whereby the section $t'$ is simultaneously compressed from two cone-faces and the wear upon both sections is evenly distributed to maintain the same form to both.

PETER DUFRESNE.

Witnesses:
R. F. HYDE,
PENN TYLER.